May 28, 1935.　　　R. ROBINSON　　　2,002,677
DRIP CATCHER FOR CONTAINERS
Filed April 17, 1934
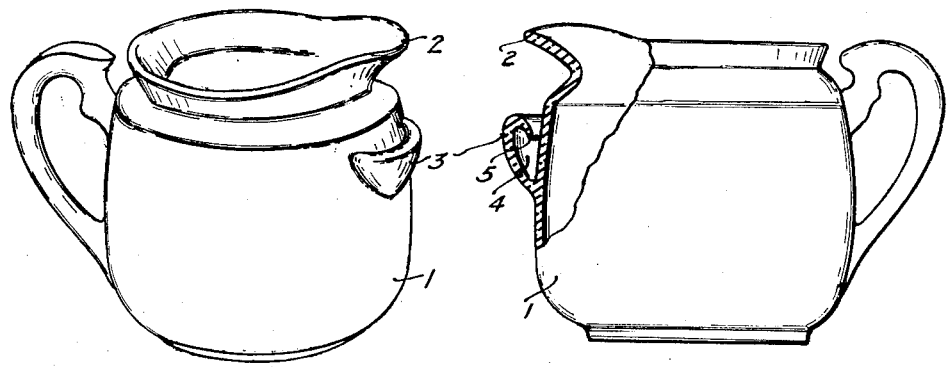
Fig. 1
Fig. 2
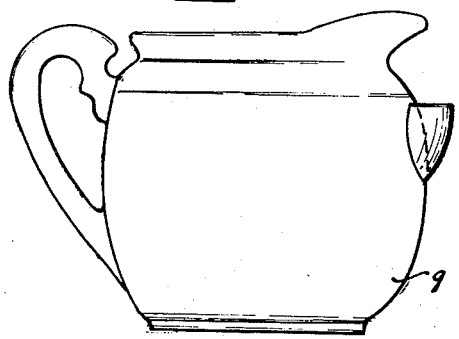
Fig. 3
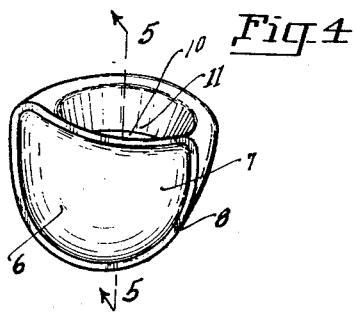
Fig. 4
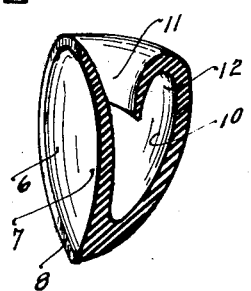
Fig. 5
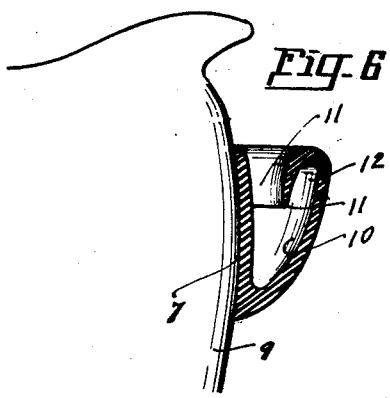
Fig. 6
Inventor
Roy Robinson
Attorney Patented May 28, 1935

2,002,677

UNITED STATES PATENT OFFICE 2,002,677

DRIP CATCHER FOR CONTAINERS

Roy Robinson, Portland, Oreg.

Application April 17, 1934, Serial No. 720,967

3 Claims. (Cl. 65—31)

My invention relates to pitchers.

I place a drip catcher immediately below and in registry alignment with the pouring spout of the pitcher. The drip catcher may be made integral with the pitcher. It may also be made from live rubber or other suitable material and having a vacuum forming cup disposed upon its rear side to permit its being attached to the pitcher through the medium of the vacuum. A return lip is disposed within the body of the drip catcher to prevent the premature pouring of the materials therefrom during the pouring of the materials from the pitcher.

The primary object of my invention is to provide a drip catcher for pitchers and the like, that will prevent the normal drip of the contents of the pitcher flowing down the side of the pitcher.

A still further object of my invention consists in providing a drip catcher that may be removed and attached to the surface of a pitcher or milk bottle or other container with equal facility.

And a still further object of my invention consists in so forming the drip catcher that the materials caught therein may be retained within the drip catcher during the normal pouring of the contents from the container.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a perspective side view of a pitcher showing one of my new and improved drip catchers formed integral with the body of the pitcher.

Fig. 2 is a side view partially in section of a pitcher having one of my new and improved drip catchers formed integral with the pitcher.

Fig. 3 is a side view of a pitcher illustrating one of my new and improved drip catchers shown removably attached thereto and held thereupon through the medium of a vacuum.

Fig. 4 is a perspective rear top view of the drip catcher used in the figures as illustrated in Figs. 3 to 6 inclusive.

Fig. 5 is a sectional side view of the drip catcher illustrated in Fig. 4. This view is taken on line 5—5 of Fig. 4, looking in the direction indicated.

Fig. 6 is a fragmentary side view of a pitcher and a sectional side view of the drip catcher shown disposed thereupon and held relative thereto through the medium of a vacuum.

Like reference characters refer to like parts throughout the several views.

I have here shown my invention as being used in conjunction with a pitcher 1. The pitcher has the usual pouring spout 2. Heretofore in devices of this kind not having a drip catcher associated therewith, the drip developed by the contents of the pitcher upon the pouring spout runs down the side of the container and mars the appearance of the device and support upon which the pitcher is placed in its normal use.

I provide a drip catcher 3 which is placed in registry with and below the pouring spout 2. A pocket 4 is disposed within the drip catcher and a return lip 5 prevents the premature pouring of the caught material within the drip catcher in the normal pouring of the material from the container or pitcher 1.

I also provide a drip catcher as illustrated in Figs. 3 to 6 inclusive in which the drip catcher is made of live rubber or other suitable resilient material. A vacuum forming cup 6 is disposed within the rear wall 7 of the drip catcher.

A peripheral edge 8 extends entirely around the vacuum forming cup and permits the attaching of the drip catcher to the surface of a pitcher 9 or to milk bottles or to any other container having a relatively smooth exterior. A drip retaining pocket 10 is disposed within the body of the drip catcher and a return lip 11 downwardly extends within the pocket. This provides a retaining well 12 within the upper portion of the drip catcher that will maintain the caught material therein when the pitcher is turned substantially upside down to pour the last of the material from the container.

While I have here shown my drip catcher as being used in conjunction with a pitcher of any suitable design I do not wish to be limited to the application of my drip catcher to pitchers as the same may be used with equal facility upon milk bottles, syrup containers and upon any and all containers where liquids are to be dispensed therefrom.

My invention is particularly useful where the viscosity of the materials being dispensed is relatively heavy.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. A new article of manufacture comprised in combination with a container, a drip catcher removably attachable to the container, the said drip catcher being comprised of resilient material, a vacuum forming cup disposed upon the rear wall of the drip catcher, a drip receiving pocket disposed within the body of the drip catcher, a return lip extending downwardly into the drip receiving pocket and a secondary pocket disposed between the return lip and the upper front wall of the device.

2. A device of the class described comprising a body member made of resilient material and having a drip receiving pocket disposed within its upper surface, a return lip integral with the body member and extending downwardly into the drip receiving pocket, and a vacuum forming cup disposed upon a wall of the body member.

3. In combination with a surface subjected to dripping material, a drip catcher removably attachable to the surface and comprised of resilient material, a vacuum forming cup disposed upon the rear wall of the drip catcher, a drip receiving pocket disposed within the body of the drip catcher, a return lip extending downwardly into the drip receiving pocket and a secondary pocket disposed between the return lip and the upper front wall of the drip catcher.

ROY ROBINSON.